United States Patent
Murai et al.

(10) Patent No.: US 8,524,835 B2
(45) Date of Patent: *Sep. 3, 2013

(54) PEROXIDE-CROSSLINKABLE FLUOROELASTOMER

(75) Inventors: Daisuke Murai, Ibaraki (JP); Mitsuru Maeda, Ibaraki (JP); Seiichiro Murata, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/119,777

(22) PCT Filed: Aug. 17, 2009

(86) PCT No.: PCT/JP2009/064382
§ 371 (c)(1),
(2), (4) Date: Mar. 18, 2011

(87) PCT Pub. No.: WO2010/032576
PCT Pub. Date: Mar. 25, 2010

(65) Prior Publication Data
US 2011/0166296 A1 Jul. 7, 2011

(30) Foreign Application Priority Data
Sep. 18, 2008 (JP) .................. 2008-239233

(51) Int. Cl.
*C08F 14/18* (2006.01)
*C07C 21/18* (2006.01)
*C07C 17/25* (2006.01)

(52) U.S. Cl.
USPC ......... 525/326.3; 526/250; 570/136; 570/155

(58) Field of Classification Search
USPC .............. 526/250; 570/136, 155; 525/326.3
See application file for complete search history.

(56) References Cited

U.S. PATENT DOCUMENTS 5,001,278 A * 3/1991 Oka et al. .................. 568/615

FOREIGN PATENT DOCUMENTS

| JP | 62-012734 | 1/1987 |
| JP | 63-023907 | 2/1988 |
| JP | 04-288305 | 10/1992 |
| WO | WO 2004/065436 A1 | 8/2004 |
| WO | WO 2005/090270 A1 | 9/2005 |
| WO | WO 2005/097846 A1 | 10/2005 |
| WO | WO 2007/085545 A1 | 8/2007 |

OTHER PUBLICATIONS

International Search Report from corresponding PCT application No. PCT/JP200904382 dated Nov. 17, 2009, 4 pgs.
International Preliminary Report on Patentability and Written Opinion from corresponding PCT application No. PCT/JP2009064382 dated Apr. 28, 2011, 5 pgs.

* cited by examiner

*Primary Examiner* — Mark Eashoo
*Assistant Examiner* — Marilou U. Lacap
(74) *Attorney, Agent, or Firm* — Brinks Hofer Gilson & Lione

(57) ABSTRACT

Disclosed is a peroxide-crosslinkable fluoroelastomer obtained by copolymerization of 0.1 to 20 mol % of a mixture of fluoroolefin iodides represented by the general formulae: $C_nF_{2n+1}CF_2CH=CF(CF_2CF_2)_mI$ [Ia] and $C_nF_{2n+1}CF=CHCF_2(CF_2CF_2)_mI$ [Ib], wherein n is an integer of 0 to 5, and m is an integer of 1 to 3. The peroxide-crosslinkable fluoroelastomer is copolymerized with a monomer having a side chain containing a peroxide-crosslinkable halogen atom, and has excellent vulcanizate physical properties and improved compression set characteristics when subjected to peroxide crosslinking.

6 Claims, No Drawings

PEROXIDE-CROSSLINKABLE FLUOROELASTOMER

RELATED APPLICATION

This application is a 35 U.S.C. §371 national phase filing of International Patent Application No. PCT/JP2009/064382, filed Aug. 17, 2009, through which and to which priority is claimed under 35 U.S.C. §119 to Japanese Patent Application No. 2008-239233, filed Sep. 18, 2008.

TECHNICAL FIELD

The present invention relates to a peroxide-crosslinkable fluoroelastomer. More particularly, the present invention relates to a peroxide-crosslinkable fluoroelastomer having a new crosslinking site.

BACKGROUND ART

Peroxide-crosslinkable fluoroelastomers are generally obtained by introducing halogen atoms contributing to peroxide-crosslinking into polymer chain ends, or by introducing peroxide-crosslinkable halogen atoms into polymer side chains. Iodine or bromine atoms are introduced as halogen atoms.

In order to increase the crosslinking density of a high-molecular-weight elastomer, it is necessary to introduce a halogen atom-containing side chain, and this is achieved by copolymerization with a monomer having a peroxide-crosslinkable halogen atom.

Monomer compounds in which the carbon atoms forming a double bond are directly bonded to iodine atoms are known; however, there are few examples of monomer compounds in which an iodine atom is bonded to the end of the long side chain. The synthesis of such monomer compounds using a known method has a long synthesis route and results in a poor yield; thus, productivity is extremely low (see Patent Documents 1 and 2).

Moreover, the synthesis of terminally iodized fluorine-containing monomers generally requires multistep reactions, each reaction of which is very troublesome. On the other hand, many unsaturated compounds having a bromine atom at the end of the long side chain are known; however, terminal bromine atoms have less reactivity than terminal iodine atoms.

Furthermore, when an elastomer having a long side chain contains a peroxide-crosslinkable halogen atom in its side chain, other side chains that are not contributed in crosslinking are presumably steric hindrance, preventing crosslinking reactions. Consequently, the vulcanizate physical properties and compression set characteristics of the resulting crosslinked products are not satisfactory.

PRIOR ART DOCUMENT

Patent Document

Patent Document 1: WO 2005/090270
Patent Document 2: JP-A-62-12734

OUTLINE OF THE INVENTION

Problem to be Solved by the Invention

An object of the present invention is to provide a peroxide-crosslinkable fluoroelastomer that is copolymerized with a monomer having a side chain containing a peroxide-crosslinkable halogen atom, and has excellent vulcanizate physical properties and improved compression set characteristics when subjected to peroxide-crosslinking.

Means for Solving the Problem

The above object of the present invention can be achieved by a peroxide-crosslinkable fluoroelastomer obtained by copolymerization of 0.1 to 20 mol % of a mixture of fluoroolefin iodides represented by the general formulae:

$$C_nF_{2n+1}CF_2CH=CF(CF_2CF_2)_mI \quad [Ia]$$

and $$C_nF_{2n+1}CF=CHCF_2(CF_2CF_2)_mI \quad [Ib],$$

wherein n is an integer of 0 to 5, and m is an integer of 1 to 3.

Effect of the Invention

The peroxide-crosslinkable fluoroelastomer of the present invention has radically active iodine atoms at the end of the long side chains derived from the mixture of fluoroolefin iodides [Ia] and [Ib]. The iodine atoms are less vulnerable to the steric hindrance of other side chains than iodine atoms directly bonded to the main chain, or than iodine atoms at the end of a shorter side chain. Therefore, the reaction efficiency of crosslinking reaction is excellent.

For this reason, the fluoroelastomer of the present invention copolymerized with the fluoroolefin iodides mixture can improve the values of strength and compression set, compared with conventionally known fluoroelastomers that contain peroxide-crosslinkable iodine and/or bromine groups, but are not copolymerized with the fluoroolefin iodides mixture. Additionally, the fluoroelastomer of the present invention may exhibit excellent elongation etc., depending on the copolymerization composition of the fluoroelastomer.

EMBODIMENTS FOR CARRYING OUT THE INVENTION

The mixture of fluoroolefin iodides used in the fluoroelastomer of the present invention as a comonomer for introducing a peroxide-crosslinkable iodine group into the side chain of the fluoroelastomer is produced as a mixture of products [Ia] and [Ib] by subjecting the —CF$_2$CH$_2$CF$_2$— bond of a fluoroalkyl iodide represented by the general formula:

$$C_nF_{2n+1}CF_2CH_2CF_2(CF_2CF_2)_mI \quad [II],$$

n: 0 to 5
m: 1 to 3 to an HF-elimination reaction in the presence of a basic compound.

The fluoroalkyl iodides, which is used as a starting material, can be obtained by sequential addition reaction of perfluoroalkyl iodide of the general formula: $C_nF_{2n+1}CF_2I$ (n: 0 to 5) with vinylidene fluoride and then with tetrafluoroethylene. The terminal group of $C_nF_{2n+1}$ may have a non-linear structure, as in (CF$_3$)$_2$CF-group.

Examples of compounds obtained by addition reaction of perfluoroalkyl iodide with vinylidene fluoride include compounds of the following formulae:

$$CF_3(CH_2CF_2)I$$

$$CF_3(CF_2)(CH_2CF_2)I$$

$$CF_3(CF_2)_2(CH_2CF_2)I$$

$CF_3(CF_2)_3(CH_2CF_2)I$ $CF_3(CF_2)_4(CH_2CF_2)I$ $CF_3(CF_2)_5(CH_2CF_2)I$ $(CF_3)_2CFCF_2(CH_2CF_2)I$ $(CF_3)_2CFCF_2CF_2(CH_2CF_2)I$ $(CF_3)_2CFCF_2CF_2CF_2(CH_2CF_2)I$

The addition reaction of vinylidene fluoride is carried out in such a manner that the perfluoroalkyl iodide is subjected to an addition reaction with pressurized vinylidene fluoride in the presence of a peroxide initiator The number of addition is 1 or more, and preferably 1, although depending on the reaction conditions. Although the reaction temperature depends on the degradation temperature of the initiator used, the reaction is generally conducted at about 80 to 120° C.; when a peroxide initiator that decomposes at a low temperature is used, the reaction can be conducted at 80° C. or below. As a peroxide initiator, tert-butyl peroxide, di(tert-butylcyclohexyl)peroxy-dicarbonate, dicetylperoxydicarbonate, or the like may be used at a ratio of about 1 to 5 mol % with respect to the perfluoroalkyl iodide.

Subsequently, the vinylidene fluoride adduct of perfluoroalkyl iodide is subjected to an addition reaction with tetrafluoroethylene. Examples of resulting products include compounds of the following formulae:

$CF_3(CH_2CF_2)(CF_2CF_2)I$ $CF_3(CH_2CF_2)(CF_2CF_2)_2I$ $CF_3(CH_2CF_2)(CF_2CF_2)_3I$ $CF_3(CF_2)(CH_2CF_2)(CF_2CF_2)I$ $CF_3(CF_2)(CH_2CF_2)(CF_2CF_2)_2I$ $CF_3(CF_2)(CH_2CF_2)(CF_2CF_2)_3I$ $CF_3(CF_2)_2(CH_2CF_2)(CF_2CF_2)I$ $CF_3(CF_2)_2(CH_2CF_2)(CF_2CF_2)_2I$ $CF_3(CF_2)_2(CH_2CF_2)(CF_2CF_2)_3I$ $CF_3(CF_2)_3(CH_2CF_2)(CF_2CF_2)I$ $CF_3(CF_2)_3(CH_2CF_2)(CF_2CF_2)_2I$ $CF_3(CF_2)_3(CH_2CF_2)(CF_2^{CF}{}_2)_3I$ $CF_3(CF_2)_4(CH_2CF_2)(CF_2CF_2)I$ $CF_3(CF_2)_4(CH_2CF_2)(CF_2CF_2)_2I$ $CF_3(CF_2)_4(CH_2CF_2)(CF_2CF_2)_3I$ $CF_3(CF_2)_5(CH_2CF_2)(CF_2CF_2)I$ $CF_3(CF_2)_5(CH_2CF_2)(CF_2CF_2)_2I$ $CF_3(CF_2)_5(CH_2CF_2)(CF_2CF_2)_3I$

In addition to these compounds, similar $(CF_2CF_2)_{1-3}I$ adducts can be used as those in which the terminal group of $C_nF_{2n+1}$ is $(CF_3)_2CF$—.

The addition reaction of the vinylidene fluoride adduct of perfluoroalkyl iodide with tetrafluoroethylene is carried out under the same conditions as in the vinylidene fluoride addition reaction. The number of addition is 1 or more, and preferably 1 to 3, although depending on the reaction conditions.

The thus-obtained fluoroalkyl iodide [II] is reacted with a basic compound to result in an HF-elimination reaction between the $CH_2$ group on the prefluoroalkyl group side and either of the $CF_2$ groups adjacent thereto, thereby producing a mixture of fluoroolefin iodides [Ia] and [Ib].

Examples of basic compounds include hydroxides of monovalent or divalent metal, such as lithium hydroxide, sodium hydroxide, potassium hydroxide, magnesium hydroxide, calcium hydroxide, and cesium hydroxide; carbonates of monovalent or divalent metal, such as sodium carbonate, sodium hydrogen carbonate, potassium carbonate, and potassium hydrogen carbonate; and inorganic basic compounds that are alkoxides of monovalent metal, such as sodium methoxide, sodium ethoxide, and potassium methoxide. Such a basic compound is used in a molar ratio of about 1 to 2, preferably about 1 to 1.5, and more preferably 1.05 to 1.2, with respect to the fluoroalkyl iodide [II].

Although the HF-elimination reaction can be carried out in the absence of a solvent, the reaction is preferably carried out in the presence of water or an organic solvent in terms of reaction efficiency and control of heat generation. Examples of organic solvents include alcohols, such as methanol, ethanol, propanol, and isopropanol; ethers, such as diethyl ether, 1,4-dioxane, and tetrahydrofuran; ketones, such as acetone, methyl ethyl ketone, and methyl isobutyl ketone; hydrocarbons, such as toluene and cyclohexane; aprotic polar solvents, such as acetonitrile, N,N-dimethyl formamide, N,N-diethyl formamide, N,N-dimethyl acetamide, N,N-diethyl acetamide, and N-methyl-2-pyrrolidone; and fluorine-containing organic solvents, such as hydrochlorofluorocarbon (e.g., HCFC-225) and hydrofluoroether (e.g., Novec HFE; a product of 3M). Preferably, alcohols are used. It is more preferable that such basic compounds or organic solvent solutions thereof are compatible with fluoroalkyl iodide.

It is preferable that alcohols or alcohol solutions in which a basic compound is dissolved, which are used as reaction solvents, are completely dehydrated, for example, by a method using a molecular sieve (e.g., molecular sieve 3A) before use. Thereby, the yield can be further improved.

Water or an organic solvent is used in a volume ratio of about 0.1 to 100, preferably about 1 to 10, and more preferably 3 to 6, with respect to the fluoroalkyl iodide [II]. However, a larger amount of solvent has no influence on the reaction efficiency; thus, the solvent is preferably used in a volume ratio of 3 to 6. Moreover, when the reaction is conducted in an aqueous solvent system, phase transfer catalysts, such as alkyl ammonium salts, alkyl phosphonium salts, and crown ethers, may be used in combination with the basic compound catalyst.

The HF-elimination reaction is carried out at about −50 to 30° C., preferably about −40 to 10° C., and more preferably about −30 to 5° C. Side reactions proceed at temperatures higher than this range, generating a large amount of by-product with an unknown structure. The reaction may be carried out at reduced pressure, atmospheric pressure, or increased pressure; in terms of ease of handling the reaction apparatus, the reaction is preferably carried out at atmospheric pressure. The reaction time is about 1 to 5 hours, and preferably about 2 to 3 hours, and the reaction is completed almost quantitatively.

When static phase separation is performed after the reaction is completed, the organic layer is separated and washed with water, for example, to remove the basic compound, and purification is then performed by distillation etc., according to a standard method, thereby obtaining the target fluoroolefin iodide mixture. When static phase separation is not occurred by using a polar solvent, for example, the solvent is distilled off under reduced pressure, followed by the same treatment as in the case where static phase separation is carried out.

The fluoroolefin iodide mixture obtained in this manner is copolymerized with, for example, at least one fluoroolefin represented by the general formula: $CX_2=CXY$ to form a fluoroelastomer. In the formula, X is H or F, and Y is H, F, $C_nF_{2n+1}$ (n: 1 to 3), or $O[CF(Z)CF_2O]_mC_nF_{2n+1}$ (Z: F or $CF_3$, n: 1 to 3, and m: 0 to 5). X and Y are the same or different, and at least one of X and Y is a fluorine atom or a fluorine-containing group.

Examples of the fluoroolefin represented by the above general formula include vinylidene fluoride, tetrafluoroethylene, hexafluoropropylene, perfluoro(methyl vinyl ether), perfluoro(ethyl vinyl ether), perfluoro(propyl vinyl ether), perfluorovinyl ether represented by the general formula: $CF_2=CFO[CF(CF_3)CF_2O]_mCF_3$ (m: 1 to 5), and the like. The fluoroolefin iodides mixture is copolymerized in an amount of about 0.1 to 20 mol %, preferably about 0.3 to 10 mol %, and more preferably about 0.5 to 5 mol %, in the fluoroelastomer.

Together with the fluoroolefin iodide mixture, a bromine group- or iodine group-containing monomer compound, preferably a bromine group-containing monomer compound, can be copolymerized in an amount of about 5 mol % or less, and preferably about 1 mol %, in the fluoroelastomer.

Moreover, examples of usable iodine-containing monomer compounds include iodotrifluoroethylene, 1,1-difluoro-2-iodoethylene, perfluoro(2-iodoethyl vinyl ether), vinyl iodide, and the like.

The copolymerization reaction is preferably carried out by an emulsion polymerization method in the presence of a polymerization initiator. As a polymerization initiator, generally used polymerization initiators, such as azo compounds and inorganic or organic peroxides, or redox initiators containing peroxide and a reducing agent in combination can be used. Examples of usable organic peroxide initiators include tert-butyl peroxide, di(tert-butylcyclohexyl)-peroxydicarbonate, dicetylperoxydicarbonate, di-n-propylperoxydicarbonate, diisopropyl peroxydicarbonate, di-sec-butylperoxydicarbonate, and the like.

The emulsion polymerization reaction is carried out in the presence of an emulsifier represented by the general formula:

RfCOOM

Rf: fluoroalkyl group, perfluoroalkyl group, fluorooxyalkyl group, perfluorooxyalkyl group, or the like
M: ammonium salt or alkali metal The amount of emulsifier used is about 0.1 to 20 wt. %, and preferably about 0.2 to 2 wt. %, based on the amount of water.

Examples of the emulsifier represented by the above general formula include those represented by the following formulae:

| | |
|---|---|
| $C_5F_{11}COONH_4$ | $C_5F_{11}COONa$ |
| $C_6F_{13}COONH4$ | $C_6F_{13}COONa$ |
| $C_6HF_{12}COONH_4$ | $C_6HF_{12}COONa$ |
| $C_6H_2F_{11}COONH_4$ | $C_6H_2F_{11}COONa$ |
| $C_7F_{15}COONH_4$ | $C_7F_{15}COONa$ |
| $C_7HF_{14}COONH_4$ | $C_7HF_{14}COONa$ |
| $C_7H_2F_{13}COONH_4$ | $C_7H_2F_{13}COONa$ |
| $C_8F_{17}COONH_4$ | $C_8F_{17}COONa$ |
| $C_8HF_{16}COONH_4$ | $C_8HF_{16}COONa$ |
| $C_8H_2F_{15}COONH_4$ | $C_8H_2F_{15}COONa$ |
| $C_9F_{19}COONH_4$ | $C_9F_{19}COONa$ |
| $C_9HF_{18}COONH_4$ | $C_9HF_{18}COONa$ |
| $C_9H_2F_{17}COONH_4$ | $C_9H_2F_{17}COONa$ |
| $C_3F_7OCF(CF_3)COONH_4$ | $C_3F_7OCF(CF_3)COONa$ |
| $C_3F_7OCF(CF_3)CF_2OCF(CF_3)COONH_4$ | $C_3F_7OCF(CF_3)CF_2OCF(CF_3)COONa$ |
| $C_3F_7O[CF(CF_3)CF_2O]_2CF(CF_3)COONH_4$ | $C_3F_7O[CF(CF_3)CF_2O]_2CF(CF_3)COONa$ |
| $C_3F_7O[CF(CF_3)CF_2O]_3CF(CF_3)COONH_4$ | $C_3F_7O[CF(CF_3)CF_2O]_3CF(CF_3)COONa$ |

Thereby, the crosslinking characteristics (i.e., elongation at break, breaking strength, compression set characteristics, etc.) of the resulting fluoroelastomer can be further improved.

Examples of bromine group-containing monomer compounds include vinyl bromide, 2,2-dibromo-1-fluoroethylene, 2-bromo-1,1-difluoroethylene, perfluoroallyl bromide, 4-bromo-1,1,2-trifluorobutene-1,4-bromo-3,3,4,4-tetrafluorobutene-1,4-bromo-1,1,3,3,4,4-hexafluorobutene-1, bromotrifluoroethylene, 4-bromo-3-chloro-1,1,3,4,4-pentafluorobutene-1,6-bromo-5,5,6,6-tetrafluorohexene-1,4-bromoperfluorobutene-1,3,3-difluoroallyl bromide, and other brominated vinyl compounds or brominated olefins; preferably, a bromine-containing vinyl ether represented by the following general formula is used:

BrRf—O—CF=$CF_2$

BrRf: bromine group-containing perfluoroalkyl group
Examples of such bromine group-containing vinyl ethers include those represented by the formulae: $BrCF_2CF_2OCF=CF_2$, $BrCF_2(CF_2)_2(CF=CF_2$, $BrCF_2(CF_2)_3(CF=CF_2$, $CF_3CFBr(CF_2)_2OCF=CF_2$, and $BrCF_2(CF_2)_4OCF=CF_2$.

The molecular weight can be controlled by adjusting the relationship between the copolymerization rate and the amount of initiator. Alternatively, the control of molecular weight can be easily performed using chain transfer agents, such as $C_4$-$C_6$ hydrocarbons, alcohols, ethers, esters, ketones, and organic halides.

When a known iodide represented by the general formula: $IC_nF_{2n}I$ and a halide represented by the general formula: $IC_nF_{2n}Br$ are used in combination as chain transfer agents, there is another advantage that a halogen atom, which is bound to the molecular end and is radically active, can be used as a crosslinking site at which peroxide crosslinking can occur.

The reaction temperature and reaction pressure vary depending on the degradation temperature of the initiator used and the copolymerization composition of the desired copolymer. In order to obtain an elastomeric copolymer, the reaction is generally carried out at a temperature of about 0 to 100° C., and preferably about 40 to 80° C., and at a pressure of about 0.8 to 4.5 MPa·G, and preferably about 0.8 to 4.2 MPa·G.

The fluoroelastomer obtained in this manner has iodine that is derived from the fluoroolefin iodides mixture and that acts as a peroxide-crosslinkable group in the copolymer. Therefore, the elastomer can be subjected to peroxide-crosslinking with an organic peroxide. Examples of the organic peroxide to be used for peroxide-crosslinking include 2,5-dimethyl-2,5-bis(tert-butylperoxy)hexane, 2,5-dimethyl-2,5-bis(tert-butylperoxy)hexine-3, benzoyl peroxide, bis(2,4-dichlorobenzoyl)peroxide, dicumyl peroxide, di-tert-butyl peroxide, tert-butyl cumyl peroxide, tert-butylperoxybenzene, 1,1-bis(tert-butylperoxy)-3,5,5-trimethylcyclohexane, 2,5-dimethylhexane-2,5-dihydroxyperoxide, α,α'-bis(tert-butylperoxy)-p-diisopropyl benzene, 2,5-dimethyl-2,5-di(benzoylperoxy)hexane, tert-butylperoxy isopropyl carbonate, and the like.

In the peroxide crosslinking method using these organic peroxides, polyfunctional unsaturated compounds, such as tri(meth)allyl isocyanurate, tri(meth)allyl cyanurate, triallyl trimellitate, N,N'-m-phenylene bismaleimide, diallyl phthalate, tris(diallylamine)-s-triazine, triallyl phosphite, 1,2-polybutadiene, ethylene-glycol diacrylate, diethyleneglycol diacrylate, and the like are generally used as co-crosslinking agents in combination with the organic peroxides for the purpose of obtaining more excellent vulcanization characteristics, mechanical strength, compression set characteristics, etc.

Further, depending on the purpose, oxides or hydroxides of divalent metals (e.g., oxides or hydroxides of calcium, magnesium, lead, zinc, and the like) can also be used as crosslinking aids. These compounds also act as acid acceptors.

The proportion of each component mixed with the peroxide-crosslinking system is generally as follows (based on 100 parts by weight of fluoroelastomer):

Organic peroxide: about 0.1 to 10 parts by weight, preferably about 0.5 to 5 parts by weight
Cocrosslinking agent: about 0.1 to 10 parts by weight, preferably about 0.5 to 5 parts by weight
Crosslinking aid: about 15 parts by weight or less Thus, a fluoroelastomer composition is formed. In addition to the above components, conventionally known fillers, reinforcing agents, plasticizers, lubricants, processing aids, pigments, and the like may suitably be incorporated into the composition.

Peroxide-crosslinking is carried out by mixing the above components using a generally used mixing method, such as roll mixing, kneader mixing, Banbury mixing, and solution mixing, followed by heating. Heating is generally carried out by press vulcanization performed at about 100 to 250° C. for about 1 to 120 minutes, and oven vulcanization (secondary vulcanization) performed at about 150 to 300° C. for about 0 to 30 hours.

EXAMPLES

The following describes the present invention with reference to examples.

Reference Example 1

A compound of the formula: $CF_3(CF_2)_3CH_2CF_2CF_2CF_2I$ (99.8 GC %) (100 g; 0.2 mol) was charged in a sealed 500-ml reactor equipped with a stirrer, and the reactor was cooled to an internal temperature of −20° C. A potassium hydroxide-ethanol solution containing 55.1 g (0.23 mol) of potassium hydroxide and 150 g of ethanol was completely dehydrated using a molecular sieve 3A, and slowly added dropwise while stirring so that the temperature in the reactor did not exceed −18° C. After completion of the addition, the temperature in the reactor was maintained at −20 to −18° C., and the reaction was terminated after 3 hours.

Cold water (0 to 5° C.) was added to the obtained product, and the mixture was stirred. After allowing to stand, the separated fluoroolefin iodide mixture layer (lower layer) was separated, and washed again with cold water (0 to 5° C.). Thus, 70.5 g (yield: 97%) of a fluoroolefin iodide mixture in the lower layer was collected. The gas chromatography analysis results were as follows:

| | |
|---|---|
| $CF_3(CF_2)_3CH=CFCF_2CF_2I$ | (46.6 GC%) |
| $CF_3(CF_2)_2CF=CHCF_2CF_2CF_2I$ | (53.2 GC%) |
| Unknown | (0.2 GC%) |

The reaction product was distilled off under reduced pressure at an internal pressure of 400 to 500 Pa, an internal temperature of 70 to 75° C., and an overhead top temperature of 55 to 57° C., thereby obtaining 68.1 g (distillation yield: 95%) of a purified reaction product (99.7 GC %). From the results of $^1$H-NMR and $^{19}$F-NMR, the purified reaction product was identified as a mixture of the compounds represented by the above-described formulae.

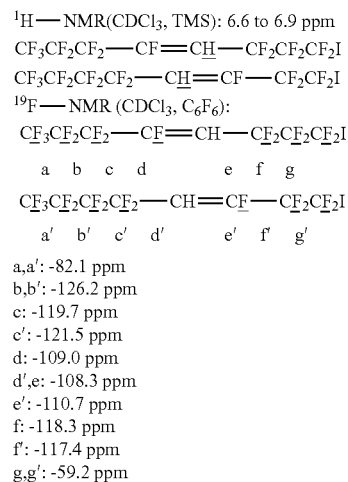

a,a': -82.1 ppm
b,b': -126.2 ppm
c: -119.7 ppm
c': -121.5 ppm
d: -109.0 ppm
d',e: -108.3 ppm
e': -110.7 ppm
f: -118.3 ppm
f': -117.4 ppm
g,g': -59.2 ppm Reference Example 2

When a potassium hydroxide-ethanol solution that was not dehydrated was used in Reference Example 1, 65.1 g (yield: 81%) of fluoroolefin iodides were collected. The gas chromatography analysis results were as follows:

$CF_3(CF_2)_3CH=CFCF_2CF_2I$ (42.0 GC %)

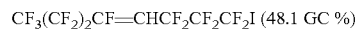

$CF_3(CF_2)_2CF=CHCF_2CF_2CF_2I$ (48.1 GC %)

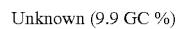

Unknown (9.9 GC %)

Example

A stainless steel reactor equipped with a stirrer was vacuumized, and the following components were charged therein:

| | |
|---|---|
| Water | 13 kg |
| $C_7F_{15}COONH_4$ | 39 g |
| $Na_2HPO_4 \cdot 12H_2O$ | 26 g |
| $CBr_2=CHF$ | 26 g |
| $ICF_2CF_2Br$ | 24 g |
| $C_4F_9CH=CF(CF_2)_2I$—$C_3F_7CF=CH(CF_2)_3I$ mixture (mixed molar ratio: 45/55) | 60 g |

Thereafter, 490 g (4.9 mop of tetrafluoroethylene [TFE], 1180 g (18.4 mol) of vinylidene fluoride [VdF], and 2330 g (15.5 mol) of hexafluoropropylene [HFP] were charged thereto, and the temperature in the reactor was increased to 70° C. The pressure after the temperature increase was 3.88 MPa·G.

Subsequently, an aqueous solution in which 24 g of ammonium persulfate was dissolved in 50 g of water was press-charged into the reactor to initiate polymerization reaction. Since the pressure in the reactor decreased along with the progress of the polymerization reaction, a mixed gas of TFE/VdF/HFP (mixed molar ratio: 16.4/62.2/21.4) was charged to the reactor as divided charges to maintain the pressure in the reactor at 3.75 to 3.85 MPa·G. The addition of the divided charge gas was stopped when the total amount of divided charge gas was 10.2 kg (after about 10 hours), and aging was performed for about 30 to 50 minutes. The pressure in the reactor at this time was 1.8 MPa·G.

To 100 parts by weight of the obtained fluoroelastomer (copolymerization molar ratio of VdF/TFE/HFP/fluoroolefin iodides mixture=66.8/16.0/16.9/0.3), 20 parts by weight of MT carbon black, 5 parts by weight of zinc oxide, 5 parts by weight of triallyl isocyanurate (TAIC M60, a product of Nippon Kasei Chemical Co., Ltd.), and 3.5 parts by weight of organic peroxide (Perhexa 25B, a product of NOF Corporation) were added, and kneaded to prepare a composition. The composition was then subjected to press vulcanization at 180° C. for 10 minutes, followed by oven vulcanization at 230° C. for 22 hours. Thereafter, vulcanizate physical properties (according to HS K6250 and K6253, which correspond to ASTM D412 and D2240, respectively), specific gravity, and compression set (according to ASTM D395 Method B) were measured.

Example 2

A 30-L stainless steel reactor equipped with a stirrer was vacuumized, and the following components were charged therein:

| | |
|---|---|
| Water | 15.5 kg |
| $C_7F_{15}COONH_4$ | 71 g |
| $Na_2HPO_4 \cdot 12H_2O$ | 51 g |
| $CF_2=CFOCF_2CF_2Br$ | 53 g |
| $ICF_2CF_2Br$ | 27 g |
| Fluoroolefin iodides obtained above (mixed molar ratio = 45:55) | 65 g |

Thereafter, 840 g (8.4 mol) of tetrafluoroethylene [TFE], 3780 g (59.1 mol) of vinylidene fluoride [VdF], and 2800 g (16.9 mol) of perfluoro(methyl vinyl ether) [FMVE] were charged thereto, and the temperature in the reactor was increased to 50° C. The pressure after the temperature increase was 3.92 MPa·G.

Subsequently, an aqueous solution in which 10 g of ammonium persulfate was dissolved in 500 g of water was press-charged into the reactor to initiate polymerization reaction. The pressure in the reactor decreased along with the progress of the polymerization reaction. When the pressure reached 1.2 MPa·G (reaction time: 13 hours), the reactor was cooled to terminate the polymerization reaction.

To 100 parts by weight of the obtained fluoroelastomer (copolymerization molar ratio of VdF/TFE/FMVE/fluoroolefin iodides mixture=72.8/10.0/17.0/0.2), 30 parts by weight of MT carbon black, 6 parts by weight of zinc oxide, 6.7 parts by weight of triallyl isocyanurate (TAIC M60), and 1.3 parts by weight of organic peroxide (Perhexa 25B) were added, and kneaded to prepare a composition. The composition was then subjected to press vulcanization at 180° C. for 10 minutes, followed by oven vulcanization at 230° C. for 22 hours. The measurements were carried out in the same manner as in Example 1.

Example 3

In Example 2, the amount of fluoroolefin iodides mixture (mixed molar ratio=45:55) was changed to 650 g, and the polymerization reaction was carried out under this condition. It took 15.5 hours from 4.05 MPa·G of the pressure after the temperature increase to 1.2 MPa·G, at which the polymerization reaction was terminated.

Using the obtained fluoroelastomer (copolymerization molar ratio of VdF/TFE/FMVE/fluoroolefin iodides mixture=72.0/9.5/16.4/2.1), the preparation of a composition, vulcanization, and measurements were carried out in the same manner as in Example 2.

Example 4

A 50-L stainless steel reactor equipped with a stirrer was vacuumized, and the following components were charged therein:

| | |
|---|---|
| Water | 13.3 kg |
| $C_7F_{15}COONH_4$ | 2.1 g |
| $Na_2HPO_4 \cdot 12H_2O$ | 36 g |
| $CF_2=CFOCF_2CF_2Br$ | 180 g |
| $ICF_2CF_2CF_2CF_2I$ | 23 g |
| Fluoroolefin iodides obtained above (mixed molar ratio = 45:55) | 250 g |

Thereafter, 3780 g of vinylidene fluoride [VdF], 1800 g of perfluoro(methyl vinyl ether) [FMVE], and 3960 g of $CF_3O[CF(CF_3)CF_2O]_4CF=CF_2$ [Monomer A] were charged thereto, and the temperature in the reactor was increased to 40° C. The pressure after the temperature increase was 3.08 MPa·G.

Subsequently, an aqueous solution in which 1.6 g of ammonium persulfate was dissolved in 50 g of water, and then an aqueous solution in which 0.32 g of sodium hydrogen sulfite was dissolved in 50 g of water were press-charged into the reactor to initiate polymerization reaction. The pressure in the reactor decreased along with the progress of the polymerization reaction. When the pressure reached 0.06 MPa·G (reaction time: 17 hours), the reactor was cooled to terminate the polymerization reaction.

Using the obtained fluoroelastomer (copolymerization molar ratio of VdF/FMVE/Monomer A/fluoroolefin iodides mixture=81.5/11.0/7.0/0.5), the preparation of a composition, vulcanization, and measurements were carried out in the same manner as in Example 2.

Example 5

In Example 4, the amount of fluoroolefin iodides mixture (mixed molar ratio=45:55) was changed to 2200 g, and the polymerization reaction was carried out under this condition. It took 24 hours from 3.22 MPa·G of the pressure after the temperature increase to 0.07 MPa·G, at which the polymerization reaction was terminated.

Using the obtained fluoroelastomer (copolymerization molar ratio of VdF/FMVE/monomer A/fluoroolefin iodides mixture=78.7/10.7/6.6/4.0), the preparation of a composition, vulcanization, and measurements were carried out in the same manner as in Example 2.

The measurement results of each example are shown in Table 1 below.

TABLE 1

| Measurement item | | Ex. 1 | Ex. 2 | Ex. 3 | Ex. 4 | Ex. 5 |
|---|---|---|---|---|---|---|
| Vulcanizate physical properties | | | | | | |
| 100% modulus | (MPa) | 4.6 | 3.7 | 4.0 | 5.0 | 5.1 |
| Elongation at break | (%) | 290 | 280 | 220 | 210 | 180 |
| Breaking strength | (MPa) | 24.1 | 22.0 | 26.1 | 12.0 | 10.2 |
| Specific gravity | | 1.900 | 1.899 | 1.900 | 1.881 | 1.880 |
| Compression set | | | | | | |
| 150° C., 70 hours | (%) | 20 | 13 | 10 | 9 | 12 |
| 200° C., 70 hours | (%) | 34 | 21 | 18 | 21 | 22 |
| 230° C., 70 hours | (%) | 61 | 55 | 58 | 53 | 61 |

Comparative Example 1

In Example 1, the polymerization reaction was carried out without using the fluoroolefin iodides mixture (mixed molar ratio=45:55). Using the obtained fluoroelastomer (copolymerization molar ratio of VdF/TFE/HFP=67/16/17), the preparation of a composition, vulcanization, and measurements were carried out in the same manner as in Example 1.

Comparative Example 2

In Example 2, the polymerization reaction was carried out without using the fluoroolefin iodides mixture (mixed molar ratio=45:55). Using the obtained fluoroelastomer (copolymerization molar ratio of VdF/TFE/FMVE=73.1/10.1/16.8), the preparation of a composition, vulcanization, and measurements were carried out in the same manner as in Example 2.

Comparative Example 3

In Example 4, the polymerization reaction was carried out without using the fluoroolefin iodides mixture (mixed molar ratio=45:55). Using the obtained fluoroelastomer (copolymerization molar ratio of VdF/FMVE/Monomer A=82.1/11.1/6.8), the preparation of a composition, vulcanization, and measurements were carried out in the same manner as in Example 2.

The measurement results of each comparative example are shown in Table 2 below.

TABLE 2

| Measurement item | | Comp. Ex. 1 | Comp. Ex. 2 | Comp. Ex. 3 |
|---|---|---|---|---|
| Vulcanizate physical properties | | | | |
| 100% modulus | (MPa) | 4.2 | 3.6 | 4.7 |
| Elongation at break | (%) | 310 | 300 | 180 |
| Breaking strength | (MPa) | 22.2 | 19.8 | 11.6 |
| Specific gravity | | 1.901 | 1.900 | 1.880 |
| Compression set | | | | |
| 150° C., 70 hours | (%) | 25 | 17 | 15 |
| 200° C., 70 hours | (%) | 39 | 28 | 27 |
| 230° C., 70 hours | (%) | 64 | 61 | 58 |

The invention claimed is:

1. A peroxide-crosslinkable fluoroelastomer obtained by copolymerization of 0.1 to 20 mol % of a mixture of fluoroolefin iodides represented by the general formulae:

$$C_nF_{2n+1}CF_2CH=CF(CF_2CF_2)_mI \quad [Ia]$$

$$C_nF_{2n+1}CF=CHCF_2(CF_2CF_2)_mI \quad [Ib],$$

wherein n is an integer of 0 to 5, and m is an integer of 1 to 3.

2. The peroxide-crosslinkable fluoroelastomer according to claim 1, which is obtained by copolymerization of said mixture of fluoroolefin iodides [Ia] and [Ib] with a fluoroolefin as a comonomer represented by the general formula:

$$CX_2=CXY,$$

wherein X is a hydrogen or fluorine atom, Y is a hydrogen or fluorine atom, a $C_nF_{2n+1}$ group wherein n is 1 to 3, or O[CF(Z)CF$_2$O]$_m$C$_n$F$_{2n+1}$, wherein Z is a fluorine atom or a trifluoromethyl group, n is 1 to 3, m is 0 to 5, X and Y are the same or different, and at least one of X and Y is a fluorine atom or a fluorine-containing group.

3. The peroxide-crosslinkable fluoroelastomer according to claim 2, wherein the fluoroolefin of the general formula: $CX_2=CXY$ is at least one of vinlyidene fluoride, tetrafluoroethylene, hexafluoropropylene, perfluoro(methyl vinyl ether), perfluoro(ethyl vinyl ether), perfluoro(propyl vinyl ether), and a perfluorovinyl ether represented by the general formula:

$$CF_2CFO[CF(CF_3)CF_2O]_mCF_3$$

wherein m is an integer of 1 to 5.

4. The peroxide-crosslinkable fluoroelastomer according to claim 1, which is further copolymerized with a bromine group-containing monomer compound.

5. A fluoroelastomer composition comprising the peroxide-crosslinkable fluoroelastomer according to claim 1 and an organic peroxide.

6. A fluoroelastomer composition comprising the peroxide-crosslinkable fluoroelastomer according to claim 4 and an organic peroxide.

* * * * *